United States Patent [19]

Pemmaraju

[11] Patent Number: 4,596,898

[45] Date of Patent: Jun. 24, 1986

[54] METHOD AND APPARATUS FOR PROTECTING STORED AND TRANSMITTED DATA FROM COMPROMISE OR INTERCEPTION

[75] Inventor: Ramarao V. Pemmaraju, Yonkers, N.Y.

[73] Assignee: Computer Security Systems, Inc., Garden City, N.Y.

[21] Appl. No.: 589,473

[22] Filed: Mar. 14, 1984

[51] Int. Cl.[4] .............................................. H04K 1/02
[52] U.S. Cl. .............................. 178/22.16; 178/22.08; 178/22.14; 178/22.19
[58] Field of Search ............... 178/22.08, 22.14–22.16, 178/22.19; 375/2.1, 2.2; 340/825.34

[56] References Cited

U.S. PATENT DOCUMENTS

| | | | |
|---|---|---|---|
| 3,657,521 | 4/1972 | Constable | 178/22.08 |
| 4,186,871 | 2/1980 | Anderson et al. | 178/22.08 |
| 4,208,575 | 6/1980 | Haltof | 178/22.08 |
| 4,328,414 | 4/1982 | Atalla | 178/22.08 |
| 4,431,865 | 2/1984 | Bernede et al. | 178/22.14 |
| 4,447,672 | 4/1984 | Nakamura | 178/22.16 |
| 4,464,678 | 8/1984 | Schiff et al. | 178/22.08 |
| 4,465,153 | 8/1984 | van de Pas et al. | 178/22.19 |

*Primary Examiner*—Salvatore Cangialosi
*Attorney, Agent, or Firm*—Epstein & Edell

[57] ABSTRACT

Protection of transmitted and stored data from compromise or interception is achieved by a combined terminal authentication and encryption technique using a random number as part of both the encryption and authentication processes. Entry of data for transmission at a transmitting terminal automatically establishes a random number which is tranmitted ahead of the data stream along with a special fixed word and a code word which is encoded with the random number. The receiving station stores the random number and decodes the code word. The decoded code word and the received special word are compared to respective pre-stored counterparts thereof to determine authenticity of the transmitting terminal. Data encryption is effected by using three keys which depend, respectively, on data word content, data word sequence and the established random number.

56 Claims, 8 Drawing Figures

METHOD AND APPARATUS FOR PROTECTING STORED AND TRANSMITTED DATA FROM COMPROMISE OR INTERCEPTION

BACKGROUND OF THE INVENTION

1. Technical Field

The present invention relates to protecting stored and transmitted data from compromise or interception by unauthorized parties. More particularly, the present invention relates to an improved method and apparatus for establishing authentication of a remote data transmitting terminal and for encrypting and decrypting data transmitted from an authorized terminal.

2. Discussion of the Prior Art

The problem of protecting stored and transmitted data from compromise or interception by unauthorized parties has become more acute in recent years. Incidents involving the use of computers for bank theft, governmental and industrial espionage, and mere vandalism have been widely reported. Consequently, there has been considerable research and developement activity directed to techniques for securing stored and transmitted data in a manner such that privacy is secured and authentication of system users is reliable, but at a reasonable cost to the user and without limiting the intended use of the transmission and storage systems. Examples of activity in this area may be found in the following U.S. Pat. Nos. 3,711,645 (Ehrat); U.S. Pat. No. 3,784,743 (Schroeder); U.S. Pat. No. 3,798,360 (Feistel); U.S. Pat. No. 4,079,195 (Frutiger); U.S. Pat. No. 4,283,599 (Atalla); U.S. Pat. No. 4,288,659 (Atalla); U.S. Pat. No. 4,310,720 (Check, Jr.); U.S. Pat. No. 4,326,098 (Bouricius et al); U.S. Pat. No. 4,349,695 (Morgan); U.S. Pat. No. 4,399,323 (Henry); and U.S. Pat. No. 4,429,180 (Unkenholz). In addition, an excellent background tutorial on the subject is provided by Diffie and Hellman in "Privacy and Authentication; An Introduction to Cryptography", Proceedings of the IEEE, Volume 67, No. 3, March 1979, pages 397-423.

User or terminal authentication is normally achieved with the use of a password. The user enters the password manually from the user's terminal, and, if the entered password matches the stored password at the computer, the computer will communicate with the terminal. Privacy of data transmission, on the other hand, is achieved by encryption and decryption techniques. These techniques employ a key function to encrypt the data before transmission at one end of the communication link, and an inverse of that key function at the other end to decrypt the received encrypted data.

The simple password approach to terminal authentication leaves much to be desired. An outside computer can be employed to effect reiterative attempts at access to a system using a different password with each attempt. Many password codes have been broken by this technique. Moreover, an eavesdropper on the transmission link can readily determine an access password from the intercepted data stream. If the password is frequently changed in order to baffle unauthorized access, authorized users must be informed of the changes and often spend considerable time retrieving the written password from a safe or other secure area.

The purpose of encryption is to prevent an eavesdropper or intercepter of the transmitted data from deciphering the intercepted data, and to prevent entry of information into a computer system unless the information is properly encrypted. Encryption techniques have varying degrees of security, depending upon how complex and economical it would be to perform successful cryptanalytic operations on intercepted data. Certainly, a fixed key is more easily broken than a key which varies. Further, if a key varies in an easily determined manner, successful cryptanalysis is feasible. For this reason Diffe and Hellman state, in their above-referenced article, that the only unconditionally secure system is one in which the plaintext or raw data is combined with a totally random key of the same length. However, the use of a random key requires synchronization between the transmitting and receiving stations in order that the received randomly encrypted data can be decrypted at the receiving station. Often, this sychronization requires transmission of the random key.

OBJECTS AND SUMMARY OF THE INVENTION

It is therefore an object of the present invention to provide a method and apparatus for reliably and efficiently preventing unauthorized access to a computer system.

It is another object of the present invention to provide a method and apparatus for protecting stored and transmitted data from compromise or interception by unauthorized parties.

Another object of the present invention is to provide a method and apparatus for authenticating terminals requesting access to a computer, the method and apparatus using a random number in conjunction with at least one additional code, and then utilizing the random number as a key during encryption.

It is still another object of the present invention to provide an encryption and decryption technique which attains a degree of security for transmitted data which has not been heretofore possible.

Still another object of the present invention is to provide a terminal authentication procedure which is performed automatically without operator intervention in response to entry of data into a terminal for transmission.

In accordance with the present invention, entry of data into a remote data transmitting terminal automatically initiates a terminal authentication procedure wherein three authentication words are inserted into the transmitted data stream ahead of the data. The first authentication word is a random number which is established when the data is entered. The second authentication word is a fixed word which corresponds to a machine function character that is normally generated and utilized to effect control of an internal terminal function such as carriage return, escape, line feed, etc. The third authentication word is a combined function of the random number and a code or password stored at the transmitting terminal. The fixed word and the code are pre-stored at the receiving terminal. Upon receipt of a stream of bits at the receiving terminal, the received random number is stored. The received fixed word is compared to the stored fixed word; if no match is found, subsequent data is rejected and an alarm is sounded. The third received word is then decoded using the stored received random number, and the result is compared to a pre-stored code word. If a match is found, the transmitting terminal is considered to be authenticated, and processing of the following data is commenced.

The transmitted data is encrypted in three stages to change the bits therein, or not, as a function of: (1) the state of certain bits in that data word; (2) the position of that data word in the sequence of entered data words; and (3) the random number established for terminal authentication. Appropriate decryption is effected at the receiver terminal.

The data words may be scrambled (i.e., their bit sequence re-arranged) one or more times during the encryption process, and appropriate descrambling is effected at the receiving terminal. Scrambling may also be employed for the random number and the predetermined code word utilized in the terminal authentication process. In addition, variable framing and variable bit length techniques may be employed in conjunction with the transmitted words to further reduce the likelihood of successful cryptanalysis.

BRIEF DESCRIPTION OF THE DRAWINGS

These and other objects, features and many of the advantages of the present invention will be better understood from the following detailed description when considered in connection with the accompanying drawings wherein like parts in each of the several figures are identified by the same reference numerals, and wherein.

DESCRIPTION OF THE PREFERRED EMBODIMENTS

Figure 1:
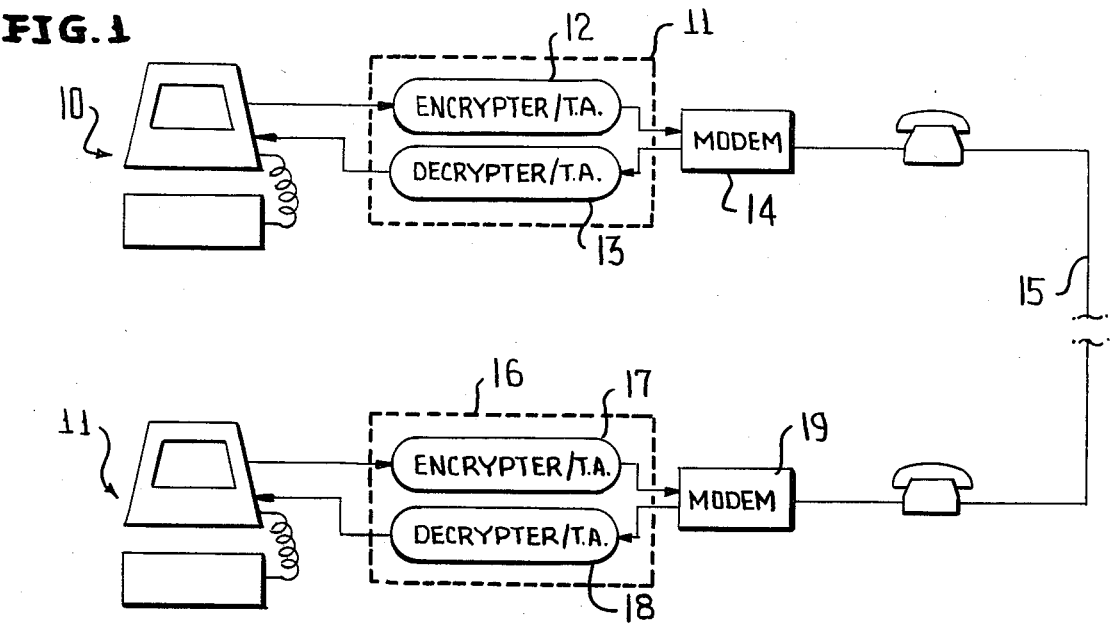
FIG. 1 is a functional block diagram of a system in accordance with the present invention, showing communication between two terminals.

Referrring specifically to FIG. 1 of the accompanying drawings, two data terminals 10 and 11, and a communications link between them, are illustrated. An encryption/decryption/authentication circuit 11 according to the present invention is inserted between terminal 10 and its modem 14 which adapts the terminal for communication via telephone line 15. A similar encryption/decryption/authentication circuit 16 is inserted between terminal 11 and its modem 19. Circuit 11 includes a transmitting circuit 12 which provides terminal authentication signals and encrypts data prior to transmission. Circuit 11 also includes a receiving circuit 13 which receives authentication signals and encrypted data from transmitting circuits of other terminals. The received authentication signals are processed to determine whether or not the transmitting circuit is authorized for system use. If no authentication is found, circuit 13 prevents access to the processor associated with terminal 10, such as by disconnecting the telephone line connection. Circuit 16 has an identical transmitting circuit 17 and receiving circuit 18.

It should be noted that in many systems there are multiple remote authorized terminals which communicate with a central processor. For such systems, it may be desirable to provide only transmitting (encryption and terminal authentication) circuits at the remote terminals and provide the central processor only with a receiving circuit (decryption and terminal authentication). That is not say that the central processor would be unable to transmit information to the terminals, or that the terminals would be unable to receive such information; rather, it may not be necessary to authenticate the identity of the central processor at each terminal, or to encrypt information transmitted from the central processor to the remote terminals.

It will be appreciated that, although a public telephone line 15 is illustrated as the communications link between the terminals, other communications links may be employed, such as dedicated lines, microwave, etc.

Figure 2:
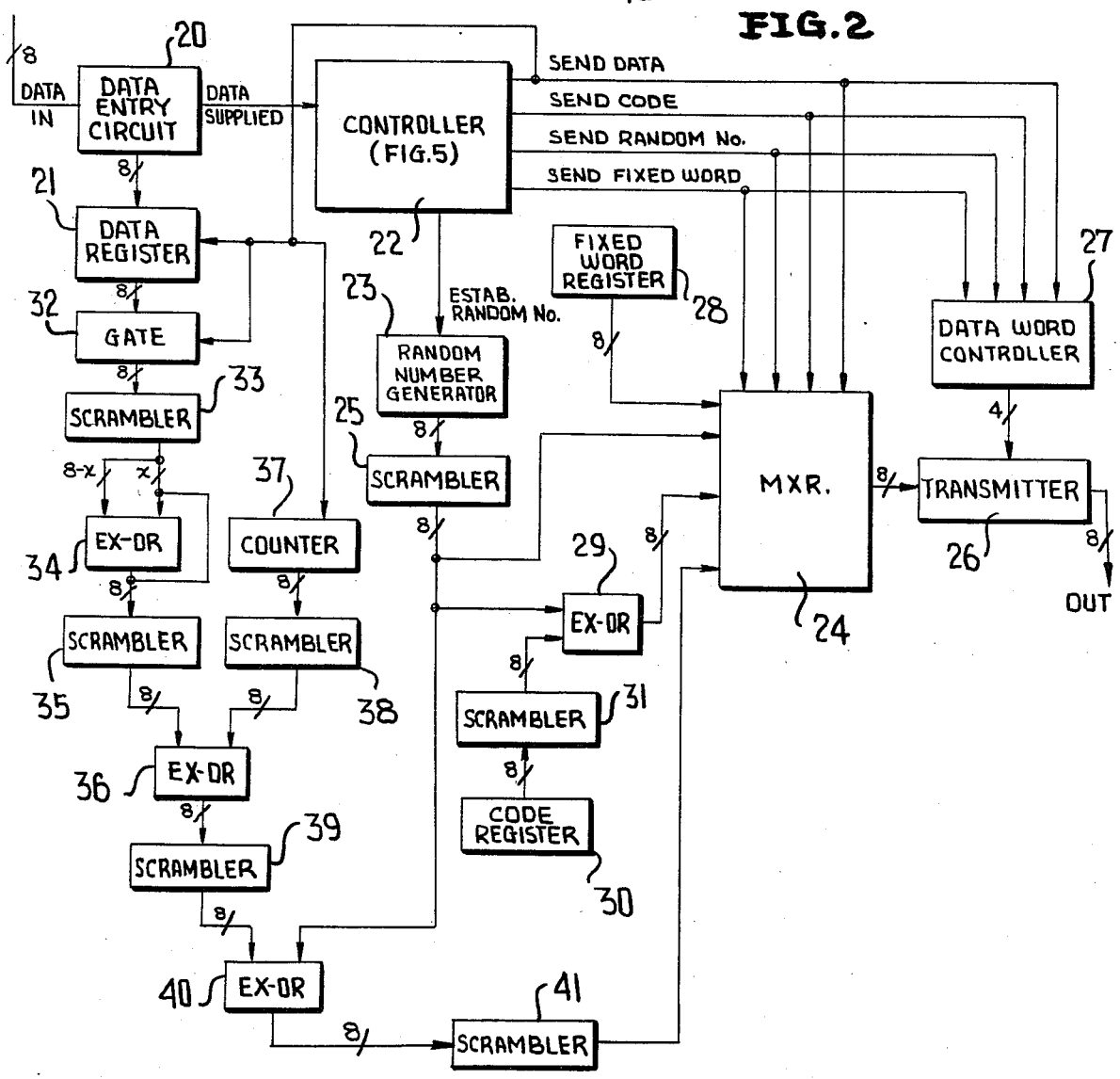
FIG. 2 is a block diagram of a data terminal transmitting circuit constructed in accordance with the present invention.

The transmitting circuits 12 and 17 are illustrated in detail in FIG. 2 to which specific reference is now made. Incoming unencrypted data entered at a transmitting terminal is received at a conventional data entry circuit 20 which transfers the data to a data register 21. As illustrated in FIG. 2, the exemplary embodiment described herein operates with eight-bit data words and therefore eight bit lines are shown between data entry circuit 20 and data register 21. It should be understood, however, that any number of bits may be employed for the data words and authentication words described herein. Data register 21 has a multi-word capacity to assure that no entered data is lost before the circuit of FIG. 2 has an opportunity to transmit the data, in encrypted form, to a receiving terminal via a transmission link. The data entry circuit 20, upon sensing the entry of data, provides a DATA SUPPLIED signal to controller 22 which has the task of controlling and sychronizing the terminal authentication and encryption procedures performed in the circuit of FIG. 2. Controller 22 is described in detail hereinbelow in relationship to FIG. 5.

Figure 3:
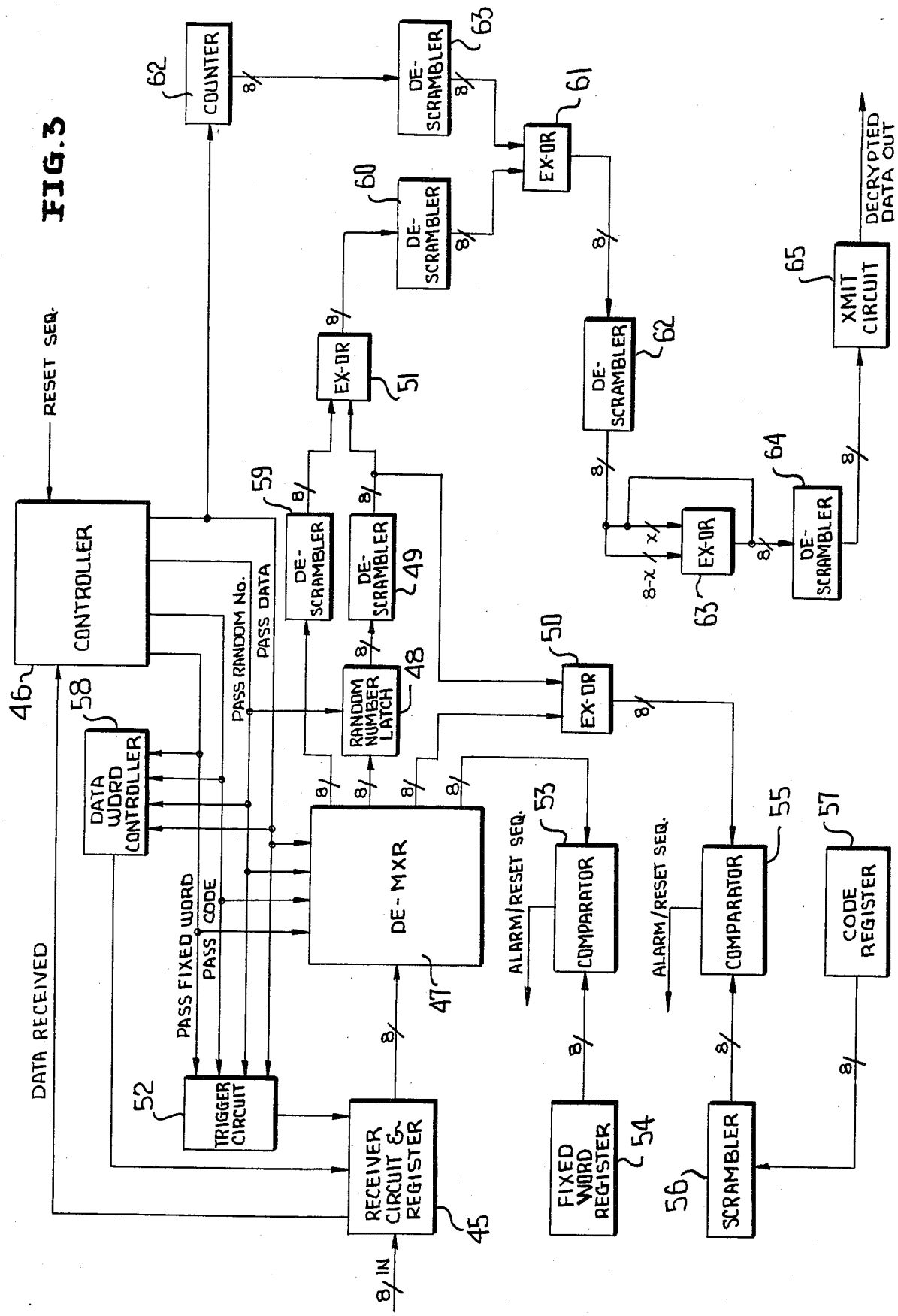
FIG. 3 is a block diagram of a data terminal receiving circuit constructed in accordance with the present invention.

Upon receiving the DATA SUPPLIED signal, controller 22 automatically initiates a terminal authentication procedure by activating the ESTAB RANDOM NO signal which is applied to random number generator 23. The random number generator 23 is described in detail hereinbelow in relation to FIG. 4; for present purposes, it is sufficient to state that the random number established in response to the ESTAB RANDOM NO signal remains fixed for the entire data entry sequence but is changed in a random manner, the next time the circuit of FIG. 2 is employed for transmitting data. The random number is a plural (for example, eight) bit number which is applied to plural input bits of a multiplexer 24 which is controlled (i.e., addressed) by signals from controller 22. As illustrated, the plural bit random number from generator 23 may be passed through a scrambler circuit 25 before being applied to multiplexer 24. Scrambler circuit 25, as is the case for all scrambler circuits illustrated and described herein, may be any conventional scrambler circuit which serves to rearrange the order of bits in the word being scrambled. An example of a scrambler circuit which may be employed for all of the scrambler and descrambler circuits illustrated in FIGS. 2 and 3 is described in detail hereinbelow in relation to FIG. 7.

After the random number has been established at random number generator 23, controller 22 activates the SEND RANDOM NO signal applied to multiplexer 24 which causes the plural bit random number to be passed to transmitter circuit 26 and transmitted to the receiving terminal. The SEND RANDOM NO signal may be applied to a data word controller 27 which controls the word length and framing of words transmitted by transmitter 26. The data word controller 26 and its function of varying the length and framing of different transmitted words are optional features of the present invention and need not be included for all embodiments; details of these features are described hereinbelow in relation to FIG. 8.

After the random number has been generated, the controller activates the SEND FIXED WORD signal which is applied to mulitplexer 22 and functions to pass a plural bit (for example, eight bit) fixed word from a fixed word register 28 to transmitter 26 via multiplexer 24. The fixed word stored in fixed word register 28 may be changed from time to time, but not during a transmission sequence, and preferably corresponds to a machine function control character, such as a carriage return, escape, line feed, home, break, tab or other similar character. These machine function characters, apart from their use as the fixed word in the present invention, are generally automatically generated and inserted at the terminal to position or otherwise control data within the terminal circuitry. These characters would normally not be considered by non-authorized users of the system as possible passwords for access to a computer, and, in the case of some of these characters, they cannot be generated in response to actuation of a key at a terminal keyboard. Further, the presence of such a character in the entered data stream by an unauthorized user (as opposed to being accessed from a register 28) will result in the appropriate machine function being performed rather than the automatic transmission of the character as required by the present invention. In any event, the fixed word from register 28 is transmitted to the receiving terminal as part of the terminal authentication process.

After the fixed word has been transmitted, the controller activates the SEND CODE signal which causes a plural bit (for example, eight bit) word to be passed from exclusive-OR gates 29 to the transmitter 26 via multiplexer 24 for transmission to the receiving terminal. Exclusive-OR gates 29 correspond to plural gates, one for each bit, and each gate receives as an input signal a respective bit from the established random number, and a respective bit of a code word stored in a code register 30. A scrambler circuit 31 may be provided to re-arrange the bits of the code word stored in register 30. The stored code word may be changed periodically and corresponds to a password. Thus, exclusive-OR gates 29 provide a plural bit word which corresponds to the plural bit word of the stored code, the bits being modified or not in accordance with the states of corresponding bits in the established random number. This exclusive-OR combination of the code and random numbers is transmitted to the receiving terminal. This terminates the terminal authentication phase of operation at the transmitting terminal circuit of FIG. 2.

It should be noted that three authentication words (i.e., the random number, the fixed word, and the code word modified by the random number) are automatically inserted ahead of the entered data stream upon entry of data into the terminal. The order of insertion need not follow the order described, as long as the receiving terminal is arranged to follow the same sequence employed at the transmitting station so that the authenticity of the transmitting station can be determined. The authentication procedure at the receiving terminal is described in detail hereinbelow in relation to FIG. 3. For present purposes it suffices to note that if the receiving terminal determines that the transmitting terminal is authorized, encrypted data can be sent from the transmitting terminal and processed at the receiving terminal. If authentication is determined to be negative, the transmitted data is not processed at the receiving terminal and, in some cases, the transmission link is automatically broken or disconnected.

Assuming that the transmitting terminal is determined to be an authorized terminal after the three authentication words have been transmitted, controller 22 activates the SEND DATA line which controls multiplexer 24 to pass encrypted data to transmitter 26 for transmission to the receiving terminal. The data encryption procedure is described in the following paragraphs.

The philosophy employed in encrypting the data is to modify each data word in accordance with three different functions, namely: (1) a function dependent upon the data word itself; (2) a function dependent upon the position of the data word in the sequence of entered data words; and (3) a random function. Modification by these three functions can be in any order, and the order employed in the embodiment described herein is to be considered only as an example.

Data from the data register is gated from that register, one word at a time, via gates 32 under the control of the SEND DATA signal from controller 22. In this regard, the SEND DATA signal is a sequence of pulses which successively transfer data words through gates 32 from register 21 while passing the transferred word, in encrypted form, through multiplexer 24 to transmitter 26. The individual bits of the data word are passed through a scrambler circuit 33 (optional) to exclusive-OR gates 34 where some of the bits are modified in accordance with the states of certain other bits. In the eight-bit word example, x bits are employed to modify the states of the other eight-x bits, and the x bits are passed unmodified. The details of the data-dependent encryption technique are described hereinbelow in relation to FIG. 6; for present purposes, however, it is sufficient to note that certain bits in each data word are modified in accordance with the states of other bits in that word. The bits of the data-dependent encrypted word are then optionally passed through a scrambler circuit 35 to respective exclusive-OR gates 36. A second input signal to each exclusive-OR gate 36 is derived from a respective bit in a count present in a counter 37. Counter 37 is incremented by each SEND DATA pulse from controller 22 so that the number in the counter changes for each data word passed to exclusive-OR gates 36. The count bits may be scrambled in scrambler circuit 38.

It will be appreciated that the data word is modified at gates 36 in a manner which is dependent upon the sequence of the word being modified in the entered data. It should also be appreciated that the count sequence provided by counter 37 need not be consecutive numbers but may instead skip or jump numbers in accordance with the manner in which counter 37 is programmed. Programming counters to provide a non-consecutive number sequence is well-known technique and need not be described herein.

The output bits from exclusive-OR gates 36 may be scrambled, or not, at scrambler circuit 39 and passed as input signals to respective exclusive-OR gates 40. The other input signals for gates 40 are derived from the established random number at random number generator 23 via scrambler 25. Thus, each of the bits in the data word is also changed, or not, in accordance with the state of a corresponding bit in the established random number.

The triple-encrypted plural bit data word is passed through a further scrambler circuit 41 (optional) to multiplexer 24 where it is passed by the SEND DATA pulse to transmitter 26. In this regard, the SEND DATA pulse may be of sufficient duration to assure that the data word is gated from register 21 and completely encrypted and passed by multiplexer 24 to transmitter 26 within the pulse duration interval. Alternatively, each word gated out of register 21 by a SEND DATA pulse and encrypted may be held in a buffer (not shown) and then passed through multiplexer 24 by the next SEND DATA pulse which also gates the next word out of the register 21.

The optional data word controller 27 may be employed to vary the word length and framing of each data word and authentication word transmitted by transmitter 26.

Referring specifically to the drawing of the receiving terminal in FIG. 3, a receiver circuit and register 45 receives data transmitted thereto from a transmitting terminal. Upon reception of data, circuit 45 provides a DATA RECEIVED signal at controller 46 which operates in a manner similar to that of controller 22 of FIG. 2. In addition, each received word is stored in its own location, in the sequence received, in the register associated with circuit 45. The DATA RECEIVED signal at controller 46 causes the controller to activate the PASS RANDOM NO at demultiplexer 47. This causes the trigger circuit 52 to activate the register at receiver circuit and register 45 to pass the first received word in the register to demultiplexer 47, and causes the demultiplexer 47 to pass that word to plural bit random number latch 48. In the example described herein, the first received word is the random number established at the transmitting terminal. The latched random number is descrambled at descrambler circuit 49 which performs a scrambling function that is the inverse of the scrambling function performed at scrambler circuit 25 of the transmitting terminal in FIG. 2. The bits of the descrambled received random number are applied as input signals to a first set of respective exclusive-OR gates 50 and a second set of respective exclusive-OR gates 51.

After passing the random number to latch 48, the controller actuates the PASS FIXED WORD signal at trigger circuit 52 and demultiplexer 47 to pass the second received data word to comparator 53. In the system being described, this word is the fixed word derived from register 28 in FIG. 2. The received fixed word is applied to the plural bit comparator 53 which performs a bit-by-bit comparison between the received fixed word and a plural bit fixed word stored in a register 54. If all of the compared bits are the same, the terminal authentication procedure continues; if the bits are not the same, comparator 53 provides a RESET SEQ signal which returns the controller to its initial state in which it awaits a DATA RECEIVED signal. In addition, the communication link is disconnected by disconnecting the call received at the terminal. Further, an audible and/or visible alarm may be sounded to indicate that an unauthorized user has attempted to obtain access to the terminal.

If the terminal authentication procedure continues, controller 46 activates the PASS CODE signal to energize trigger circuit 52 and demultiplexer 47 to pass the bits from the received word from the register in circuit 45 to second inputs of respective exclusive-OR gates 50. As previously described, gates 50 also receive respective bits from the received random number at latch 48. Thus, exclusive-OR gates 50 serve to de-combine the received random number and received code word, effectively removing the effects of exclusive-OR gates 29 of FIG. 2. The output bits from gates 50 are applied to a comparator 55 which also receives, via scrambler circuit 56, a code word stored in a register 57. Scrambler 56 performs the identical scrambling function to that performed by scrambler 31 in FIG. 2. If the two words at comparator 55 match on a bit-by-bit basis, the proper combined code word is deemed to have been received and the transmitting terminal is deemed to be an authorized terminal. If no match is found at comparator 55, the RESET SEQ signal is activated to terminate the data sequence and, if appropriate, disconnect the transmission link. An alarm may also be sounded or flashed to signify that an unauthorized user has attempted to gain access to the system.

The foregoing description concerning comparators 53 and 55 assumes that an exact bit-by-bit match is required to permit further operation. However, it may be desirable that the fixed words at the transmitting and receiving terminals not be identical, in order to confuse non-authorized users. Similarly, the transmitted and received stored codes may differ. Under such circumstances the differing words are provided with a fixed relationship which can then be sensed at the comparators instead of an exact bit-by-bit match. For example, the two words may have their odd-positioned bits inverted, and the comparators would be designed to look for this difference.

As part of the transfer of authentication and data words from circuit 45, each word may have its length and framing varied by data word controller 58 which operates in a manner inverse to data word controller 27 to restore the received words to their standard framing and bit number.

If the transmitting terminal is an authorized terminal, controller 46 activates the PASS DATA signal to demultiplexer 47 and trigger circuit 52. The PASS DATA signal is a series of pulses which pass a respective series of data words from circuit 45 through demultiplexer 47 and descrambler 59 to second inputs of respective exclusive-OR gates 51. Descrambler 59 performs the inverse function of scrambler 41 of FIG. 2. Exclusive-OR gates 51 perform the inverse function of exclusive-OR gates 40 of FIG. 2 so that the effects of the established random number are removed from the received data word as it appears at the output terminals of exclusive-OR gates 51. The output bits from exclusive-OR gates 51 are passed to descrambler circuit 60 which performs the inverse function of the function performed by scrambler circuit 39 of FIG. 2. The output bits from descrambler circuit 60 are applied as input signals to respective exclusive-OR gates 61. The other input signals applied to exclusive-OR gates 61 are derived from a counter 62, the output bits from which are passed through descrambler 63 before being applied to gates 61. Counter 62 is incremented with each PASS DATA pulse and operates in a manner identical to counter 37 of FIG. 2. Descrambler 63 is the inverse of scrambler circuit 38 in function. It will be appreciated that exclusive-OR gates 61 function to remove the encryption effects based on the position of the decrypted word in the received data word sequence.

The output bits from exclusive-OR gates 61 are passed through a further descrambler circuit 62 which operates in an inverse manner to that of scrambler circuit 35 in FIG. 2. The output bits from descrambler circuit 62 are modified at exclusive-OR gates 63 in the same manner described above in relation to exclusive-OR gates 34. Specifically, 8-x of the bits are modified, or not, in accordance with the states of the x other bits, the latter bits passing unmodified through exclusive-OR gates 63. The exclusive-OR gates 63 thus serve to decrypt the data words so as to remove the effect of data dependance therefrom. The resulting decrypted data word is passed to descrambler 64 which operates as an inverse function of scrambler circuit 33 to provide a decrypted word to transmitter circuit 65 for transmission to the processing circuits.

Figure 4:
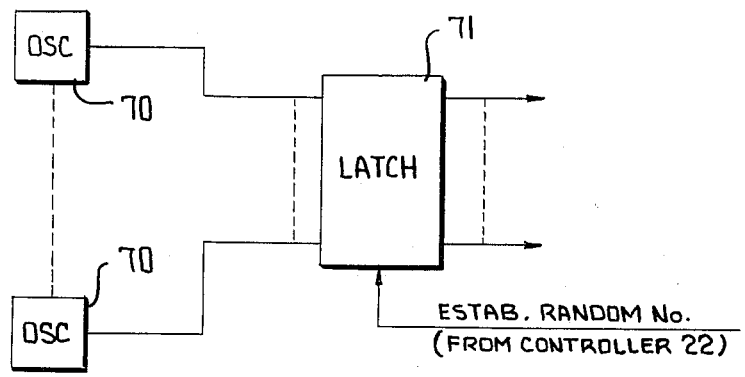
FIG. 4 is a block diagram of a random number generator employed in the circuit Of FIG. 2.

Referring specifically to FIG. 4 of the accompanying drawings, an example of a random number generator, capable of serving the function of random number generator 23 of FIG. 2, is illustrated. A plurality of oscillators 70, there being one oscillator for each bit in the random word, provide output signals to respective input terminals of a plural-bit latch circuit 71. In the absence of an activated ESTAB RANDOM NO signal from controller 22, the output signals from latch 71 continue to change as the various oscillators output signals alternate binary states. Activation of the ESTAB RANDOM NO signal causes the latch to hold, at its output terminals, the states of the existing at the time the controller-derived signal is received. Since the various oscillators are operated at different frequencies and/or duty cycles, the word defined by the state of the bits in latch 71 at any time is entirely random. Thus, the ESTAB RANDOM NO signal establishes a random number at the latch outputs. The ESTAB RANDOM NO signal remains applied to latch 71 for the duration of the transmitter sequence so as to assure that the established random number is available for the entire sequence.

Figure 5:
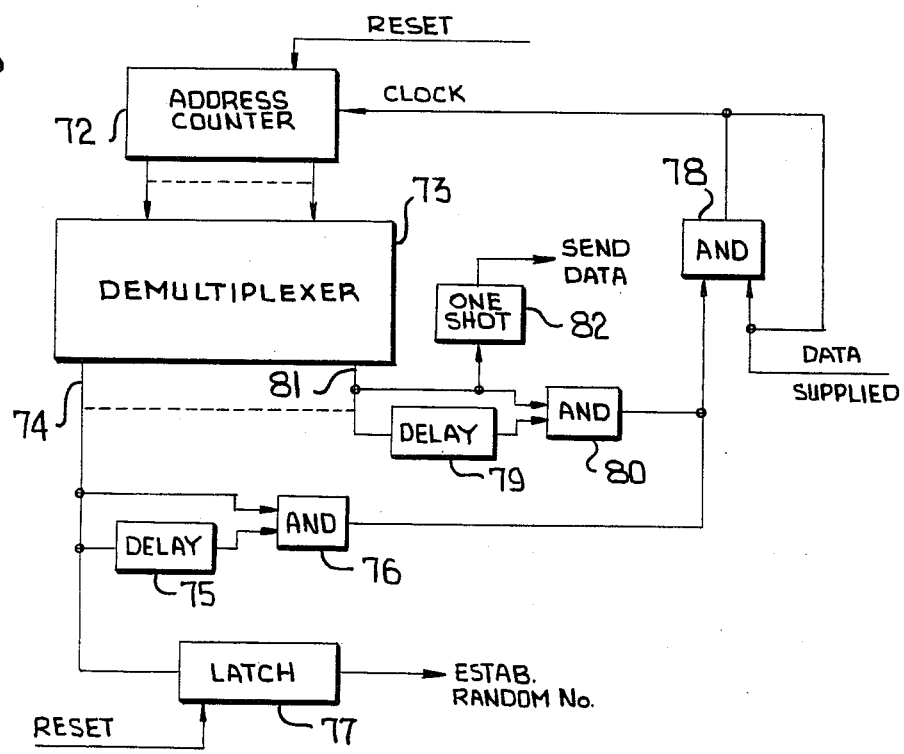
FIG. 5 is a block diagram of a controller employed in the circuits of FIGS. 2 and 3.

An example of a controller which can serve the function of controllers 22 and 46 is illustrated in FIG. 5. Specifically, an address counter 72 is employed to provide the address bits for a demultiplexer 73. Depending upon the count in address counter 72, one of the output lines of the demultiplexer is actuated. The address counter 72 is incremented initially by the DATA SUPPLIED signal (in the case of controller 22) or by the DATA RECEIVED signal (in the case of controller 46) to start the control sequence. When the address counter, which is initially reset, is first incremented, it provides a first output signal 74 to each of delay circuits 75 and AND gate 76. The signal is also applied to a latch 77 which provides the ESTAB RANDOM NO signal to the random number generator 23 for the remainder of the control sequence. The output signal from delay circuit 75 is applied to AND gate 76 so that this gate is enabled after activation of signal 74 at a time determined by the delay inherent in delay circuit 75. The output signal from AND gate 76 enables an AND gate 78 to clock the address counter to its next address count. The next output signal from demultiplexer 73, in addition to performing its above-described control function, is also passed through a delay circuit to an AND gate, and directly to that AND gate to clock the address counter accordingly.

The address counter 72 is preprogrammed to repetitively activate the last demultiplexer output line 81 after all of the previous lines have been activated. This output line passes through a delay circuit 79 to AND gate 80 and is also directly connected as an input to AND gate 80. Further, output line 81 is connected to a one-shot multivibrator 82. The output signal from one-shot multivibrator 82 is the SEND DATA signal. Thus, considering the functions performed by controller 22 of FIG. 2, once the authentication words have been transmitted, output line 81 from demultiplexer 73 is activated and produces an output pulse from one-shot multivibrator 82. This output pulse is applied to the data register 21, gate 32 and counter 37. After the delay inserted by delay circuit 79, AND gate 80 is activated to clock address counter 72 through AND gate 78. This has the effect of changing the count at address counter 72 but once again activating signal line 81. Re-activation of signal line 81 produces another output pulse from one-shot multivibrator 82 and the counter is again incremented, after a delay, via delay circuit 79, AND gate 80 and AND gate 78. This cycle of repeatedly activating output line 81 and providing the SEND DATA pulses continues until no more data is present in the data register 21. This is recognized at the controller by the absence of the DATA SUPPLIED signal at AND gate 78.

Alternatively, the controller may receive its reset signal by manually actuated means.

Figure 6:
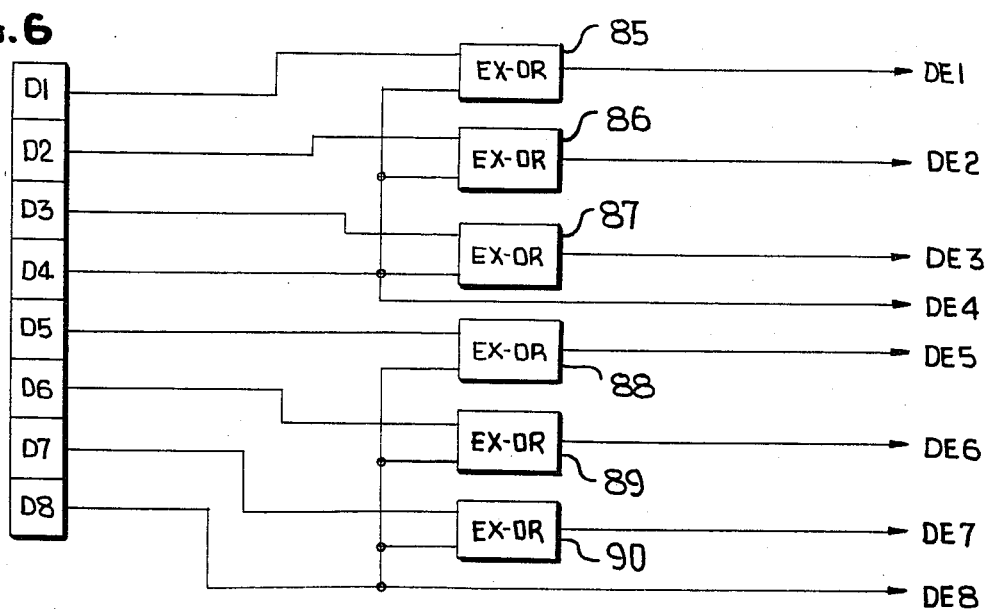
FIG. 6 is a block diagram of the data-dependent encryption circuit employed in the circuit of FIG. 2.

The function of encrypting each data word in accordance with the content of certain bits in that data word is illustrated in the circuit of FIG. 6. In the example illustrated in FIG. 6, an eight bit data word has three of its bits modified by the state of another of its bits, and three further bits modified by the state of still another of the bits. Thus, for the example illustrated in FIG. 6, the value of x is two. More partiously, the unencrypted bits are designated D1-D8, inclusive. There are six exclusive-OR gates 85, 86, 87, 88, 89 and 90, the number of such gates corresponding to 8-x, wherein X in the present example has the value of two. Gate 85 receives as its input signals the bits D1 and D4. Gate 86 receives bits D2 and D4, and gate 87 receives bits D3 and D4. Gates 88, 89 and 90 receive bits D5, D6 and D7, along with the common bit D8. The output bits from the data dependent encrypter of FIG. 6 are designated DE1--DE8, inclusive. The states of the bits DE1, DE2, DE3, DE5, DE6 and DE7 will be the same or differ from the states of the unencrypted corresponding bits D1, D2, D3, D5, D6 and D7, depending upon the states of D4 and D8. Thus, if D4 is in the binary one state, DE1, DE2 and DE3 will be opposite in state to corresponding bits D1, D2 and D3, respectively. On the other hand, if the state of D4 is binary zero, DE1, DE2 and DE3 will have the same states as corresponding bits D1, D2 and D3, respectively. The same relationship holds true for the manner in which the state of bit D8 controls the states of bits DE5, DE6 and DE7. It is to be noted that bits DE4 and DE8 have states which always correspond to the states of D4 and D8. Of course, the function provided by the circuit of FIG. 6 can be modified to change the value of x whereby the number of bits used to modify the state of other bits would be other than two.

Figure 7:
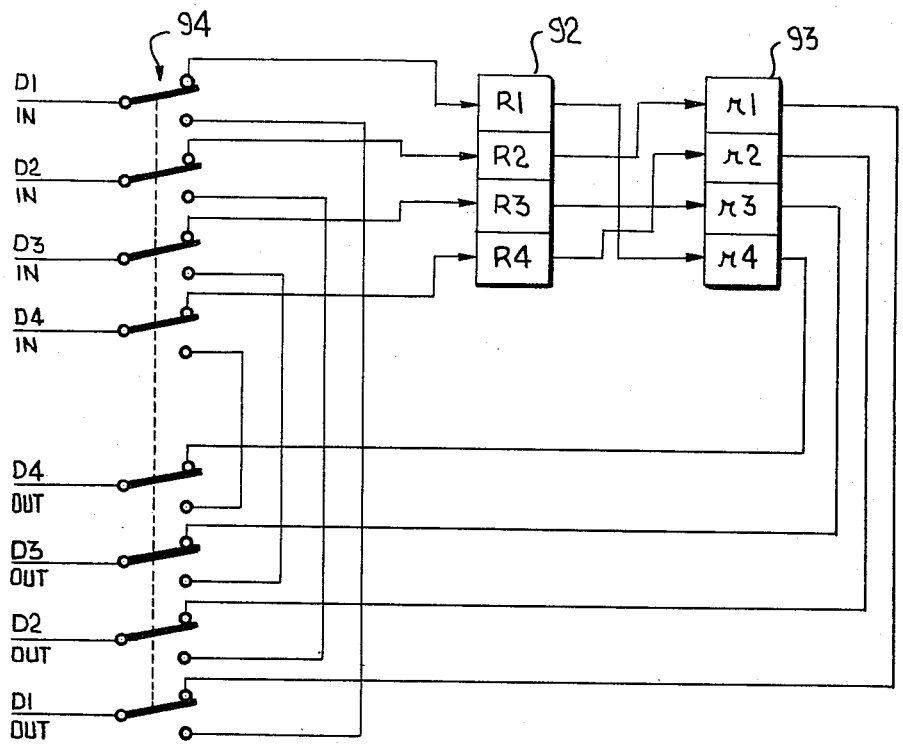
FIG. 7 is a schematic diagram of a scrambler/descrambler circuit employed in the circuits of FIGS. 2 and 3.

The scrambler/descrambler circuits illustrated in FIGS. 2 and 3 are further illustrated in greater detail in the circuit of FIG. 7 to which specific reference is now made. In order to facilitate an understanding and description of the scrambling/descrambling function, only four bits are illustrated in the diagram of FIG. 7. It is to be understood that if more bits are employed, the same principles apply. The scrambler includes two registers 92 and 93, each of which includes a number of stages equal to the number of bits to be scrambled. If the input the bits D1–D4 are applied to register 92 to stages R1–R4, respectively, the bits reside in register 92 in their proper original sequence. However, this sequence is re-arranged by connecting stage R1 of register 92 to stage r4 of register 93. Likewise, stage R2 in register 92 is connected to stage r1 in register 93, and stage R4 is connected to r2. Bit D3 is not re-arranged since its stage R3 is connected to stage r3. The interconnection of stages between registers 92 and 93 need not be precisely what is shown in FIG. 7 but can follow any interconnection pattern. The important point, however, is that the pattern used for scrambling the bits in the encryption circuit must be followed inversely for descrambling the bits in the decryption circuit.

The circuit of FIG. 7 also provides the alternative of bypassing the scrambler by means of an eight-pole two-position switch 94. Specifically, in the position of the switch 94 shown in FIG. 7, the input data bits D1–D4 are applied to stages R1–R4, and the output bits D1–D4 are connected to stages r1–r4, respectively. If switch 94 is now placed in the other position, registers 92 and 93 are bypassed and the input bits merely pass directly through the circuit to the corresponding output lines.

Figure 8:
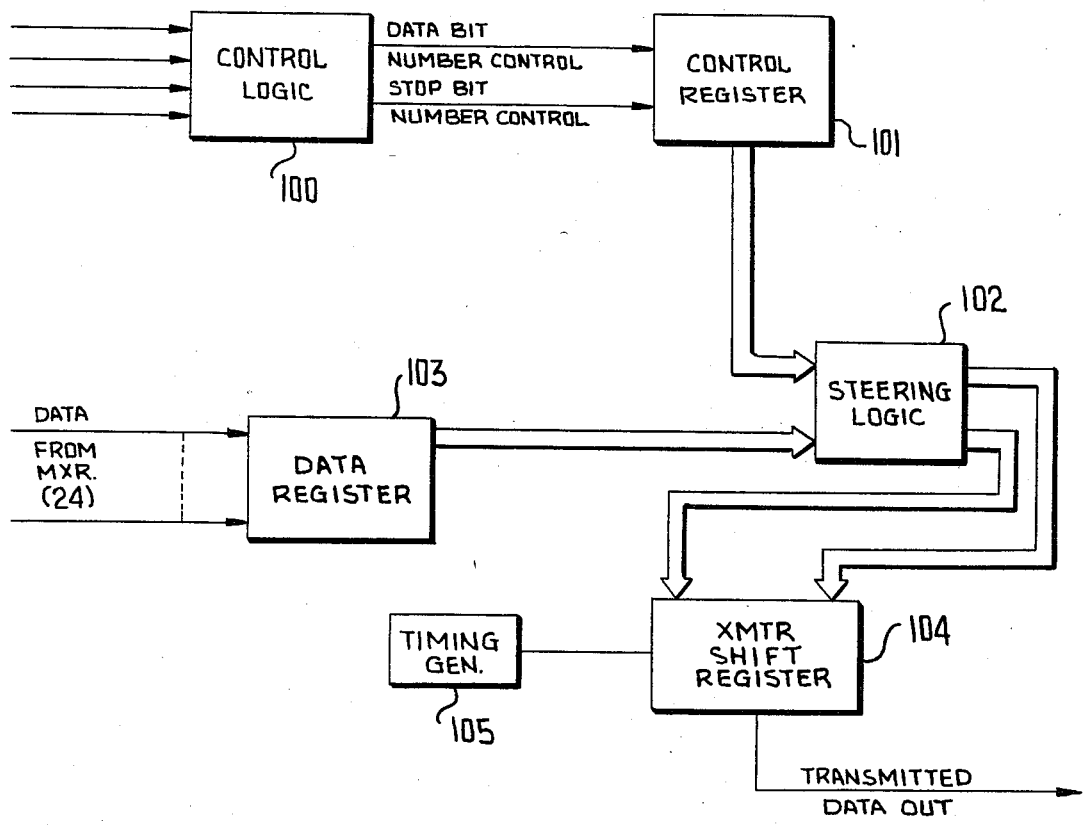
FIG. 8 is a block diagram of the transmitter control circuitry employed in the circuit of FIG. 2.

The optional data word control function, performed by data word controller 27, is illustrated in block diagram form in FIG. 8 to which specific reference is now made. The function of the data word controller is to change the number of bits in different transmitted words, or to change the number of framing bits in each transmitter word, to confuse an unauthorized interceptor of the data. Specifically, when the terminal sends or receives data, it sends or expects the data to be in a particular format. If there is a change in the number of data bits or stop bits in a given word, the computer cannot recognize the data. The data word control function of the present invention assures that both ends of the transmission line are synchronized to recognize a varying word length format. In other words, the number of data bits and the number of stop bits are changed from word to word during transmission in accordance with this optional feature of the invention. The receiving station must be capable of recognizing data from this varying word length format. Basically, the variation of bit length from word to word is effected in a fixed pattern which is stored as part of the control logic and steering logic in each of the data word controllers 27 and 58. The control logic 100 receives the control signals from controller 22 (or controller 46) and, depending upon the state of these signals at any time provides signals representing the number of data bits and number of stop bits to be employed. This information is stored in the control register to effect the steering logic 102 which receives the data to be transmitted from multiplexer 24 (or to be received from demultiplexer 47) via data register 103. The steering logic adds or deletes stop bits or data bits to the data at the transmitter shift register 104 which is controlled by a timing generator or clock 105. The control logic includes an internal counter to register PASS DATA or SEND DATA pulses to increment its count. The count is used to control the data bit number control and stop bit number control signals which are applied to the control register 101 to define the number of stop bits and data bits transmitted with each data word. The steering logic 102, data register 103, transmitter shift register 104 and timing generator 105 are preferably all part of an integrated circuit of the type which has been designated universal asynchronous receiver-transmitter (UART), such as the circuit sold as model number 8256 by the Intel Corporation of Santa Clara, Calif.

From the foregoing description it will be appreciated that the invention makes available a novel security apparatus and method for preventing unauthorized access to a computer. Terminal authentication is integrated with encryption of data by automatically inserting terminal authentication code words ahead of the data stream which has been entered in the transmitting terminal. A random number is employed as part of the terminal authentication coding. In addition, a pre-stored fixed word, corresponding to a machine function control, is employed as part of the terminal authentication coding. Encryption of data involves three levels of encryption wherein each data word is modified in accordance with the content of that data word, the position of that data word in the sequence of entered data words, and the established random number.

Having described various embodiments of a new and improved method and apparatus for protecting stored and transmitted data from compromise or interception, it is believed that other modifications, variations and changes will be suggested to those skilled in the art in light of the description set forth above. It is therefore to be understood that all such variations, modifications and changes are believed to fall within the scope of the invention as defined by the appended claims.

What is claimed is:

1. Apparatus for limiting access to and use of a data receiving terminal to one or more authorized data transmitting terminals, said apparatus comprising:
   at each authorized data transimitting terminal:
   means responisve to entry of data to be transmitted for establishing a plural bit random number;
   means for transmitting said random number to said data receiving terminal;
   word storage means for storing a plural bit predetermined transmitter word;
   means for transmitting said predetermined transmitter word to said data receiving terminal;
   code storage means for storing a plural bit transmitter code word;
   means for modifying said transmitter code word as a function of said random number to provide a plural bit modified transmitter code word, said means for modifying including means for determining the state of each bit in said modified transmitter code word on the basis of a comparison of the state of a corresponding bit in said transmitter code word with the state of a corresponding bit in said random number; and
   means for transmitting said modified transmitter code word to said data receiving terminal;
   at said data receiving terminal in response to receiving transmitted bits:
   means for receiving and storing the random number transmitted from a data transmitting terminal;
   means for receiving and storing the predetermined transmitter word transmitted from a data transmitting terminal;

means for storing a plural bit predetermined receiver word;
data path means for passing received data for processing;
first comparator means for inhibiting passage of received data along said data path means unless the modified received word and the stored receiver code word have a predetermined relationship.

2. The apparatus according to claim 1 wherein said means for modifying said transmitter code word includes means for combining said transmitter code word and said random number in an exclusive OR function, and wherein said means for modifying said received transmitter code word includes means for combining said received transmitter code word and the stored received random number in an exclusive OR function.

3. The apparatus according to claim 1 wherein said first predetermined relationship corresponds to identity between the received predetermined transmitter word and the stored predetermined receiver word.

4. The apparatus according to claim 1 wherein said second predetermined relationship corresponds to identity between the modified received word and stored receiver code word.

5. Apparatus for limiting access to and use of a data receiving terminal to one or more authorized data transmitting terminals, said apparatus comprising:
at each authorized data transmitting terminal:
means responsive to entry of data to be transmitted for establishing a plural bit random number;
means for transmitting said random number to said data receiving terminal;
word storage means for sotring a plural bit predetermined transmitter word;
means for transmitting said predetermined transmitter word to said data receiving terminal;
code storage means for storing a plural bit transmitter code word;
means for modifying said transmitter code word as a function of said random number to provide a modified transmitter code word; and
means for transmitting said modified transmitter code word to said data receiving terminal;
at said data receiving terminal, in response to receiving transmitted bits:
means for receiving and storing the random number transmitted from a data transmitting terminal;
means for receiving and storing the predetermined transmitter word transmitted from a data transmitting terminal;
means for storing a plural bit predetermined receiver word;
data path means for passing received data for processing;
first comparator means for inhibiting passage of receivied data along said data path means unless the received predetermined transmitter word and the stored predetermined receiver word have a first predetermined relationship;
means for storing a plural bit receiver code word;
means for receiving the modified transmitter code word transmitted from a data transmitting terminal;
means for modifying the received transmitter code word as a function of the stored receiver random number to provide a modified received word; and
second comparator means for inhibiting passage or received data along said data path means unless the modified received word and the stored receiver code word have a predetermined relationship;
wherein said predetermined transmitter word corresponds to a machine function character of the kind which is internally generated automatically at said data transmitter terminal for use in arranging data characters for processing.

6. The apparatus according to claim 1 further comprising:
a first scrambler means located at each authorized data transmitting terminal for re-arranging the sequence of bits in said transmitter code word in a first predetermined manner, wherein said means for modifying the transmitter code word receives the transmitter code word in its re-arranged bit sequence; and
second scrambler means located at said data receiver terminal for re-arranging the bit sequence of said receiver code word in said first predetermined manner, wherein said second comparator means receives the receiver code word in its re-arranged bit sequence.

7. The apparatus according to claim 6 further comprising:
third scrambler means located at each authorized data transmitting terminal for re-arranging the original bit sequence of said established random number in a second predetermined manner, wherein said means for transmitting said random number transmits the random number in its re-arranged bit sequence, and wherein said means for modifying said transmitter code word receives said random number in its re-arranged bit sequence; and
de-scrambler means located at said data receiving terminal for re-arranging the bit sequence of said stored received random number in a manner to restore the original bit sequence, and wherein said means for modifying the received code word receives the descrambled stored received random number in the restored original bit sequence.

8. The apparatus according to claim 1 further comprising:
first scrambler means located at each authorized data transmitting terminal for re-arranging the original bit sequence of said established random number in a predetermined manner, wherein said means for transmitting said random number transmits the random number in its re-arranged bit sequence, and wherein said means for modifying said transmitter code word receives said random number in its re-arranged bit sequence; and
de-scrambler means located at said data receiving terminal for re-arranging the bit sequence of said stored received random number in a manner to restore the original bit sequence, and wherein said means for modifying the received transmitter code word receives the descrambled stored received random number in the restored original bit sequence.

9. The apparatus according to claim 1 wherein each authorized data transmitting terminal includes encryption means operative subsequent to transmission of said predetermined data word, said random number, and said modified transmitter code word for successively transmitting, in encrypted form, data words which are entered in said data transmitting terminal; and wherein said data receiving terminal includes decryption means operative in response to said first and second predetermined relationships being detected at said first and second comparator means, respectively, for decrypting received data words and passing the decrypted data words along said data path means for processing.

10. The apparatus according to claim 9 wherein said encryption means comprises data modifying means for modifying each data word to be transmitted in accordance with a predetermined data-dependent function, and wherein said decryption means comprises further modifying means for modifying each received data word in accordance with said predetermined data-dependent function.

11. The apparatus according to claim 10 wherein said predetermined data-dependent function is an exclusive-OR function, wherein said data modifying means and said further modifying means each comprise means for combining certain bits of each data word with other bits in that word in respective exclusive-OR gates.

12. The apparatus according to claim 9 wherein said encryption means comprises first sequencer means for modifying each entered data word in accordance with a sequencing function which is dependent upon the position of that word in the sequence of entered data words, and wherein said decryption means comprises second sequencer means for modifying each received data word in accordance with a sequencing function which is dependent upon the position of that received word in the sequence of received data.

13. The apparatus according to claim 12 wherein said first sequencer means comprises:
first counter means for providing a first plural bit count word which changes as each entered data word is transmitted to said data receiving terminal; and first gating means for modifying the bits in each data word as a function of corresponding bits in said first count word;
and wherein said second sequencer means comprises:
a second counter means for providing a second plural bit count word which changes as each received data word is received at said data receiving terminal; and second gating means for modifying the bits in each received data word as a function of corresponding bits in said second count word.

14. The apparatus according to claim 13 wherein said first and second gating means each includes a plurality of exclusive-OR gates, each arranged to receive a respective bit from said data word and a respective corresponding bit from said count word.

15. The apparatus according to claim 9 wherein said encryption means comprises randomizer means for modifying each data word to be transmitted as a function of the established random number; and wherein said decryption means comprises de-randomizer means for modifying each received data word as a function of the stored received random number.

16. The apparatus according to claim 15 wherein said randomizer means comprises means for combining certain bits of each data word with corresponding bits of said established random number in respective exclusive-OR gates; and wherein said de-randomizer means comprises means for combining certain bits in each received data word with corresponding bits of the stored received random number in respective exclusive-OR gates.

17. The apparatus according to claim 9 wherein said encryption means comprises means for modifying each entered data word to provide a modified word for transmission which is modified as a first function of the entered data word, as a second function of the position of the entered data word in the sequence of entered data words, and as a third function of the established random number.

18. The apparatus according to claim 17 wherein said decryption means comprises means for modifying each received data word to provide a decrypted word corresponding to a respective entered data word in unmodified format.

19. The apparatus according to claim 17 wherein said decryption means comprises means for decrypting each received modified word to provide an unmodified word devoid of said first function of the entered data word, said second function of the position of the entered data word in said sequence, and said third function of said established random number.

20. The apparatus according to claim 9 wherein each entered data word includes n bits, n being a positive integer at least equal to four, and wherein said encryption means provides a first encrypted data word and comprises x exclusive-OR gates, x being a positive integer between 1 and $n-1$, each exclusive-OR gate receiving a respective bit of said entered data word as a first input signal and at least one other bit of said data word as a second input signal, whereby the state of the output signal from each exclusive-OR gate is the same as or different from the state of its first input signal in accordance with the state of said other bit, wherein said first encrypted data word includes n bits made up of the output signals from said x exclusive-OR gates and n-x bits of said data word which do not serve as a first input signal for one of said x exclusive-OR gates, and wherein said at least one other bit corresponds to one of said n-x bits.

21. The apparatus according to claim 9 wherein said encryption means includes scrambler means for rearranging the sequence of bits in each data word to be transmitted.

22. The apparatus according to claim 9 wherein said encryption means comprises means for varying the number of bits associated with each word transmitted from said data transmitting terminal to said data receiving terminal.

23. A method for limiting access to and use of a data receiving terminal to one or more authorized transmitting terminals, said method comprising the steps of:
at each authorized data transmitting terminal:
in response to entry of data to be transmitted, establishing a plural bit random number;
transmitting said random number to said data receiving terminal;
storing a plural bit predetermined transmitted word;
transmitting said predetermined transmitter word to said data receiving terminal;
storing a plural bit transmitter code word;
modifying said transmitter code word as a function of said random number to provide a modified transmitter code word; and
transmitting said modified transmitter code word to said data receiving terminal;

at said receiving terminal, in response to receiving transmitted signal bits:
  receiving and storing the random number transmitted from a data transmitting terminal;
  receiving and storing the predetermined transmitter word transmitted from a data transmitting terminal;
  storing a plural bit predetermined receiver word;
  inhibiting passage of received data bits for processing unless the received predetermined transmitter word and the stored predetermined receiver word have a first predetermined relationship;
  storing a plural bit receiver code word;
  receiving the modified transmitter code word transmitted from a data transmitting terminal;
  modifying the received transmitter code word as a function of the stored received random number to provide a modified received word; and
  inhibiting passage of received data bits for processing unless the modified received word and the stored receiver code word have a second predetermined relationship;
and further comprising the steps of:
  re-arranged the original bit sequence of said established random number in a second predetermined manner, wherein said random number is transmitted in its re-arranged bit sequence, and wherein the step of modifying said transmitter code word invloves modifying the transmitter code word woth the random number in its re-arranged bit sequence; and
  re-arranging the bit sequence of said stored received random number at said data receiving terminal in a manner to restore the original bit sequence, wherein the step of modifying the received transmitter code word includes modifying the received tansmitter code word with the received random number in its restored original bit sequence.

24. A method for restricting access to a computer to only authorized data terminals, said method comprising the steps of:
  in response to entry of a plural bit data word into said terminal, providing three authentication words for identifying an authorized data terminal; and
  transmitting the entered data words to said computer in a transmission sequence with said three authentication words interposed in said sequence prior to all of the entered data words;
  wherein the step of generating includes the steps of:
  establishing a plural bit random number for said transmission sequence as one of said three authentication words;
  retrieving a stored fixed words as another of said authentication words;
  retrieving a code word; and
  modifying said code word as a function of said established random number to provide a modified code word as still another of said authentication words.

25. The method according to claim 24 wherein the step of transmitting includes the step of:
  modifying each entered data word before it is transmitted by changing or not the state of certain bits of the entered data word in accordance with the state of at least one other bit in the entered data word.

26. The method according to claim 25 wherein the step of transmitting includes the step of:
  modifying each entered data word before it is transmitted by changing bits, or not, in that word as a function of the position of that word in the sequence of entry of data words.

27. The method according to claim 26 wherein the step of transmitting includes the step of:
  modifying each entered data word before it is transmitted by changing bits, or not, in that word as a function of respective bits in said established random number.

28. The method according to claim 25 wherein the step of transmitting includes the step of:
  modifying each entered data word before it is transmitted by changing bits, or not, in that word as a function of respective bits in said established random number.

29. The method according to claim 24 wherein the step of transmitting includes the step of:
  modifying each entered data word before it is transmitted by changing bits, or not, in that word as a function of the position of that word in the sequence of entry of data words.

30. The method according to claim 29 wherein the step of transmitting includes the step of:
  modifying each entered data word before it is transmitted by changing bits, or not, in that word as a function of respective bits in said established random number.

31. The method according to claim 24 wherein the step of transmitting includes the step of:
  modifying each entered data word before it is transmitted by changing bits, or not, in that word as a function of respective bits in said established random number.

32. A method for limiting access to and use of a data receiving terminal to one or more authorized transmitting terminals, said method comprising the steps of:
  at each authorized data transmitting terminal:
    in response to entry of data to be transmitted, establishing a plural bit random number;
    transmitting said random number to said data receiving terminal;
    storing a plural bit predetermined transmitter word;
    transmitting said predetermined transmitter word to said data receiving terminal;
    storing a plural bit transmitter code word;
    modifying said transmitter code word as a function of said random number to provide a plural bit modified transmitter code word in which the state of each bit is determined on the basis of a comparison of the state of a corresponding bit in said transmitter code word with the state of a corresponding bit in said random number; and
    transmitting said modified transmitter code word to said data receiving terminal;
  at said receiving terminal, in response to receiving transmitted signal bits:
    receiving and storing the random number transmitted from a data transmitting terminal;
    receiving and storing the predetermined transmitter word transmitted from a data transmitting terminal;
    storing a plural bit predetermined receiver word;
    processing unless the received predetermined transmitter word and the stored predetermined receiver word have a first predetermined relationship;

storing a plural bit receiver code word;
receiving the modified transmitter code word transmitted from a data transmitting terminal;
modifying the received transmitter code word as a function of the stored received random number to provide a modified received word; and
inhibiting passage of received data bits for processing unless the modified received word and the stored receiver code word have a second predetermined relationship.

33. The method according to claim 32 wherein the step of modifying said transmitter code word includes combining said transmitter code word and said random number in an exclusive-OR function, and wherein the step of modifying said received transmitter code word includes combining said received transmitter code word and the stored received random number in an exclusive-OR function.

34. The method according to claim 31 wherein said first predetermined relationship corresponds to identity between the received predetermined transmitter word and the stored predetermined receiver word.

35. The method according to claim 32 wherein said second predetermined relationship corresponds to identity between the modified received word and the stored receiver code word.

36. A method for limiting access to and use of a data receiving terminal to one or more authorized transmitting terminals, said method comprising the steps of:
at each authorized data transmitting terminal:
in response to entry of data to be transmitted, establishing a plural bit random number;
transmitting said random number to said data receiving terminal;
storing a plural bit predetermined transmitter word;
transmitting said predetermined transmitter word to said data receiving terminal;
storing a plural bit transmitter code word;
modifying said transmitter code word as a function of said random number to provide a modified transmitter code word; and
transmitting said modified transmitter code word to said data receiving terminal;
at said receiving terminal, in response to receiving transmitted signal bits:
receiving and storing the random number transmitted from a data transmitting terminal;
receiving and storing the predetermined transmitter word transmitted form a data transmitting terminal;
storing a plural bit predetermined receiver word;
inhibiting passage of received data bits for processing unless the received predetermined transmitter word and the stored predetermined receiver word have a first predetermined relationship;
storing a plural bit receiver code word;
receiving the modified transmitter code word transmitted from a data transmitting terminal;
modifying the received transmitter code word as a function of the stored received random number to provide a modified received word; and
inhibiting passage of received data bits for processing unless the modified received word and the stored receiver code word have a second predetermined relationship;
wherein said predetermined transmitter word corresponds to a machine function character of the kind which is internally generated automatically at a data transmitter terminal for use in arranging data characters for processing.

37. The method according to claim 32 further comprising the steps of:
re-arranging the sequence of bits in said transmitter code word in a first predetermined manner, wherein the step of modifying the transmitter code word involves modifying the transmitter code word in its re-arranged bit sequence; and
re-arranging the bit sequence of said receiver code word in said first predetermined manner, wherein the step of inhibiting unless said second predetermined relationship is detected involves comparison of the modified received word with the receiver code word in its re-arranged bit sequence.

38. The method according to claim 37 further comprising the steps of:
re-arranging the original bit sequence of said established random number in a second predetermined manner, wherein said random number is transmitted in its re-arranged bit sequence, and wherein the step of modifying said transmitter code word involves modifying the transmitter code word with the random number in its re-arranged bit sequence; and
re-arranging the bit sequence of said stored received random number at said data receiving terminal in a manner to restore the original bit sequence, wherein the step of modifying the received transmitter code word includes modifying the received transmitter code word with the received random number in its restored original bit sequence.

39. The apparatus according to claim 32 further comprising the steps of:
at each data transmitting terminal, in response to transmission of said predetermined data word, said random number and said modified transmitter code word to said data receiving terminal, successively transmitting, in encrypted form, data words which are entered into said data transmitting terminal; and, at said data receiving terminal, in response to detection of said first and second predetermined relationships, decrypting received data words and passing the decrypted data words for processing.

40. The method according to claim 39 wherein the step of transmitting in encrypted form includes modifying each data word to be transmitted in accordance with a predetermined data dependent function, and wherein the step of decryption comprises modifying each received data word in accordance with said predetermined data dependent function.

41. The method according to claim 40 wherein said predetermined data dependent function is an exclusive-OR function, wherein the step of modifying each data word to be transmitted includes the step of combining certain bits of each such data word with other bits of that word in respective exclusive-OR functions, and wherein the step of modifying each received data word includes the step of combining certain bits of each received data word with other bits of that word in respective exclusive-OR functions.

42. The method according to claim 39 wherein the step of transmitting in encrypted form includes the step of modifying each entered data word in accordance with a sequencing function which is dependent upon the position of that word in the sequence of entered data words, and wherein the step of decryption includes the step of modifying each received data word in accordance with a sequencing function which is dependent upon the position of that received data word in the sequence of received data.

43. The method according to claim 42 wherein the step of modifying each entered data word includes the step of providing a first plural bit count word which changes as each entered data word is transmitted to said data receiving terminal; and modifying the bits in each data word as a function of corresponding bits in said first count word; and wherein the step of modifying each received data word includes the steps of:
providing a second plural bit count word which changes as each received data word is received at said data receiving terminal; and
modifying the bits in each received data word as a function of corresponding bits in the second count word.

44. The method according to claim 39 wherein the step of transmitting in encrypted form comprises modifying each data word to be transmitted as a function of the established random number, and wherein said step of decryption comprises modifying each received data word as a function of the stored received random number.

45. The method according to claim 39 wherein said step of transmitting in encrypted form comprises modifying each entered data word to provide a modified word for transmission which is modified as a first function of the bits in the entered data word, as a second function of the position of the entered data word in the sequence of entered data words, and a third function of the established random number.

46. The method according to claim 45 wherein said step of decrypting comprises modifying each received data word to provide a decrypted word corresponding to a respective entered data word in unmodified format.

47. The method according to claim 45 wherein said step of decrypting comprises decrypting each received modified data word to provide an unmodified word devoid of said first function of the entered data word, said second function of the position of the entered data word in said sequence, and said third function of said established random number.

48. A method for use in conjunction with a computer system to determine whether or not encrypted data is received from an authorized transmitting terminal, and to decrypt encrypted data received from an authorized terminal, said method comprising the steps of:
in response to reception of a stream of bits, separating a predetermined number of bits at the beginning of said stream from the remainder of said stream;
segmenting said predetermined number of bits into three terminal authentication words, namely: a received random number word, a received fixed word, and a received code word;
comparing said received fixed word to a pre-stored fixed word and inhibiting acceptance of the remainder of said bit stream if the received and pre-stored fixed words do not have a first predetermined relationship;
modifying the received code word as a predetermined function of the received random number word to provide a modified code word;
comparing said modified code word to a pre-stored word and inhibiting acceptance of the remainder of said bit stream if the modified and pre-stored code words do not have a second predetermined relationship;
in response to detecting both said first and second predetermined relationships, decrypting data words which comprise the remainder of said bit stream.

49. The method according to claim 48 wherein the step of decrypting includes:
modifying each received data word by changing bits, or not, in that word as a function of respective bits in said received random word.

50. The method according to claim 49 wherein the step of decrypting includes:
modifying each received data word by changing bits, or not, in that word as a function of the position of that word in the sequence of received data words.

51. The method according to claim 50 wherein the step of decrypting includes:
modifying each received data word by changing certain bits, or not, in that word in accordance with the state of at least one other bit in that word.

52. The method according to claim 49 wherein the step of decrypting includes:
modifying each received data word by changing certain bits, or not, in that word in accordance with the state of at least one other bit in that word.

53. The method according to claim 48 wherein the step of decrypting includes:
modifying each received data word by changing bits, or not, in that word as a function of the position of that word in the sequence of received data words.

54. The method according to claim 48 wherein the step of decrypting includes:
modifying each received data word by changing certain bits, or not, in that word in accordance with the state of at least one other bit in that word.

55. Apparatus for encrypting plural bit data words entered into said apparatus in sequence, said apparatus comprising:
means for modifying bits in each entered word as a function of the state of at least one other bit in that data word;
means for modifying bits in each entered data word as a function of the position of that word in said sequence; and
means for modifying bits in each entered data word as a function of a randomly selected word.

56. A method for encrypting plural bit data words which are entered into a terminal in a sequence, said method comprising the steps of:
modifying bits in each entered data word as a function of the state of at least one other bit in that data word;
modifying bits in each entered data word as a function of the position of that word in said sequence; and
modifying bits in each entered data word as a function of a randomly selected word.

* * * * *